United States Patent
Bernsen et al.

(10) Patent No.: US 10,902,141 B2
(45) Date of Patent: Jan. 26, 2021

(54) METHOD, SOFTWARE PROGRAM PRODUCT, DEVICE, AND SYSTEM FOR MANAGING DATA FLOW FROM A CLOUD STORAGE DEVICE

(71) Applicant: KONINKLIJKE PHILIPS N.V., Eindhoven (NL)

(72) Inventors: Johannes Arnoldus Cornelis Bernsen, Eindhoven (NL); Saeed Sedghi, The Hague (NL)

(73) Assignee: Koninklijke Philips N.V., Eindhoven (NL)

( * ) Notice: Subject to any disclaimer, the term of this patent is extended or adjusted under 35 U.S.C. 154(b) by 184 days.

(21) Appl. No.: 16/083,900

(22) PCT Filed: Mar. 21, 2017

(86) PCT No.: PCT/EP2017/056603
§ 371 (c)(1),
(2) Date: Sep. 11, 2018

(87) PCT Pub. No.: WO2017/162615
PCT Pub. Date: Sep. 28, 2017

(65) Prior Publication Data
US 2019/0080110 A1    Mar. 14, 2019

(30) Foreign Application Priority Data

Mar. 22, 2016   (EP) ..................................... 16161633
Jun. 9, 2016    (EP) ..................................... 16173742

(51) Int. Cl.
*G06F 21/62*    (2013.01)
*H04L 9/32*     (2006.01)
(Continued)

(52) U.S. Cl.
CPC ........ *G06F 21/6218* (2013.01); *G06F 21/602* (2013.01); *G06F 21/6209* (2013.01);
(Continued)

(58) Field of Classification Search
None
See application file for complete search history.

(56) References Cited

U.S. PATENT DOCUMENTS 8,418,236 B1 *   4/2013   Havemose .......... H04L 63/0823
                                                         726/5
9,203,614 B2    12/2015   Zhang et al.
(Continued)

FOREIGN PATENT DOCUMENTS

CN           104717297 A      6/2015

*Primary Examiner* — William J. Goodchild (57) ABSTRACT

A method for a client device (1) to request data from a cloud storage device (2) comprises receiving a user request (UR) specifying requested data (RD), producing a client evaluation result (ER1) by evaluating an access policy associated with the requested data, and optionally also producing a client cryptographic commitment (P1) on the client evaluation result (ER1). The user request (UR) and the optional client cryptographic commitment (P1) may be transmitted to the cloud storage device (2), and in response a cloud evaluation result (ER2) may be received from the cloud storage device (2), the cloud evaluation result (ER2) being produced by the cloud storage device (2) by evaluating the access policy associated with the requested data. Then, the client evaluation result (ER1) and the cloud evaluation result (ER2) may be compared, and if the client evaluation result (ER1) fails to match the cloud evaluation result (ER2), a warning message may be produced.

17 Claims, 8 Drawing Sheets

(51) Int. Cl.
*H04L 29/06* (2006.01)
*H04L 9/06* (2006.01)
*G06F 21/60* (2013.01)
*H04L 9/08* (2006.01)

(52) U.S. Cl.
CPC ............ *H04L 9/0643* (2013.01); *H04L 9/083* (2013.01); *H04L 9/0897* (2013.01); *H04L 9/3218* (2013.01); *H04L 9/3236* (2013.01); *H04L 63/102* (2013.01); *H04L 63/10* (2013.01)

(56) References Cited

U.S. PATENT DOCUMENTS

| | | |
|---|---|---|
| 9,628,268 B2 | 4/2017 | Kiang et al. |
| 2012/0321086 A1 | 12/2012 | Souza et al. |
| 2014/0281531 A1 | 9/2014 | Phegade et al. |
| 2015/0095343 A1* | 4/2015 | Divilly .................. H04L 67/327 707/741 |
| 2015/0150075 A1 | 5/2015 | Vahlis et al. |
| 2015/0281185 A1 | 10/2015 | Cooley |
| 2016/0078239 A1* | 3/2016 | Beiter ................. G06F 21/6209 713/164 |
| 2016/0344736 A1* | 11/2016 | Khait .................... G06F 21/335 |

* cited by examiner

METHOD, SOFTWARE PROGRAM PRODUCT, DEVICE, AND SYSTEM FOR MANAGING DATA FLOW FROM A CLOUD STORAGE DEVICE

CROSS-REFERENCE TO PRIOR APPLICATIONS

This application is the U.S. National Phase application under 35 U.S.C. § 371 of International Application No. PCT/EP2017/056603, filed on Mar. 21, 2017, which claims the benefit of European Patent Application No. 16161633.9, filed on Mar. 22, 2016 and European Patent Application No. 16173742.4, filed on Jun. 9, 2016. These applications are hereby incorporated by reference herein.

FIELD OF THE INVENTION

The present invention relates to cloud storage of data. More in particular, the present invention relates to a method for a client device to request data from a cloud storage device, a method for a cloud storage device to provide data to a client device, and to apparatus embodying these methods.

BACKGROUND OF THE INVENTION

It is well known to store data "in the cloud", that is, on multiple data servers of which the physical locations need not be known to the users. A problem that arises with cloud storage is security: only a limited number of parties should have access to a data owner's stored data, which all other parties should not be able to gain access to those particular data. The parties which can be allowed access to a particular set of data, and the conditions under which access can be granted, may be specified in a so-called access policy.

Each data retrieval request may involve an access policy check, in which an entity determines whether it is allowed to retrieve the data: both a cloud storage device and a client device may check whether the particular requesting user is allowed to retrieve the data. However, one of the devices may be faulty or compromised, in which case the access policy check may be abused.

To better protect data stored in the cloud and to prevent unauthorized use, it is known to encrypt those data using a key, typically a secret key. However, this introduces the problems of key management and access to keys.

United States Patent Application US2012/0321086 discloses a data storage system which receives encrypted data from a user. The data storage system stores the received encrypted data according to a predefined policy. The policy allows the encrypted data to be released when a threshold number of requests from verified third parties is received. This known system requires a number of third parties to allow data access. In the absence of third parties, or when communications with third parties fail, this known system cannot work.

SUMMARY OF THE INVENTION

It is an object of the present invention to solve this problem by providing a method for a client device to request data from a cloud storage device, which method does not require the approval of multiple third parties to access stored data.

In accordance with the invention, a method for a client device to request data from a cloud storage device comprises:
 receiving a user request specifying requested data,
 producing a client evaluation result by evaluating an access policy associated with the requested data,
 transmitting the user request to the cloud storage device,
 receiving a cloud evaluation result from the cloud storage device, the cloud evaluation result being produced by the cloud storage device by evaluating the access policy associated with the requested data,
 comparing the client evaluation result and the cloud evaluation result, and
 producing, if the client evaluation result fails to match the cloud evaluation result, a warning message.

By evaluating an access policy associated with the requested data and producing a client evaluation result, the client device checks whether the requesting user may access the requested data. In other words, the client device checks whether the user request complies with the access policy. By receiving the cloud evaluation result, which has been produced by the cloud storage device by also evaluating the access policy associated with the requested data, it is possible to compare the evaluation results and to determine whether both devices correctly applied the same policy. If the evaluation results differ, a warning message is produced which may be transmitted to the user. The warning message may additionally, or alternatively, be sent to another entity, such as a systems administrator, an events handling center, or a key management device.

It is noted that the access policy may be stored in both the client device and the cloud storage device, so that each device may independently evaluate the access policy. In some embodiments, the access policy may additionally, or alternatively, be stored in a further device, such as a key management device.

It is further noted that information such as the user request, the cloud evaluation result and the client evaluation result may be encrypted before transmission and be decrypted upon receipt to increase the data security of the method. The warning message may also be encrypted before transmission.

The warning message is transmitted when the client evaluation result fails to match the cloud evaluation result, that is, when the policy evaluation carried out by the client device and the policy evaluation carried out by the cloud storage device yield different results. This may be an indication of a compromised device.

Embodiment of the method further comprises:
 producing a client cryptographic commitment on the client evaluation result, and
 transmitting the client cryptographic commitment to the cloud storage device, preferably together with the user request.

By producing and transmitting a commitment on its evaluation result to the cloud storage device, the client device lets the cloud storage device know that it has evaluated the access policy without, however, disclosing the outcome of the evaluation. The cloud storage device, on the other hand, may later use the commitment to check whether the client device's evaluation result was influenced by the cloud storage device's evaluation, as the client device's evaluation result should conform with the commitment. Producing and transmitting a commitment thus allows checking the evaluation result. The client cryptographic commitment may be transmitted together with the user request, but may also be transmitted separately.

An embodiment of the method further comprises transmitting the client evaluation result to the cloud storage device. This may be done unconditionally, but is preferably only carried out if the client evaluation result matches the cloud evaluation result, and if the evaluation result is positive. That is, if the comparison of the evaluation results carried out by the client device produces a match, indicating that the client device and the cloud storage device agree on the access policy of the requested data, then the client device transmits its evaluation result to the cloud storage device. This allows the cloud storage device to also carry out a comparison of the evaluation results. As the cloud storage device has already received the commitment on the evaluation result of the client device, receiving the actual evaluation result allows the cloud storage device to verify the client evaluation result, thus ensuring that it is unaltered. In addition, it can be required that the evaluation result is positive, that is, that the evaluation result indicates that the request matches the access policy.

In some embodiments, the evaluation result may comprise a single bit, or a limited number of bits. In order to improve the security of the method, the client evaluation result may be extended by a random number, which may have a length of 128, 256 bits or even more. Both the client device and the cloud storage device may store this common random number, allowing both devices to reproduce the commitments. Alternatively, or additionally, this random number may be transmitted together with the client evaluation result.

In some embodiments, the client evaluation result may always be sent to the cloud storage device, independent of the outcome of the comparing action, but preferably after the comparing action.

The evaluation results produced by the client device and the cloud storage device may be positive, indicating that the requested data may be accessed by the requesting user, or negative, indicating that the requesting user may not access the requested data. If the comparison produces a match, and if the evaluation results are positive, the client device may receive the requested data from the cloud storage device. Subsequently, the client device may transmit the received data to the user. If the evaluation result are negative, the client device may transmit a suitable message to the user, indicating that access to the requested data is denied.

As mentioned above, the client device can transmit its commitment on its evaluation result to the cloud storage device. This measure enhances the security, as the cloud storage device first has to transmit its evaluation result before receiving the client evaluation result, thus excluding the possibility that a compromised cloud storage device mimics the evaluation of the client device. In an embodiment, the security is further enhanced by the cloud storage device initially transmitting a commitment on the cloud evaluation result, instead of the actual cloud evaluation result. More in particular, in an embodiment of the method receiving a cloud evaluation result from the cloud storage device is preceded by receiving a cloud cryptographic commitment on the cloud evaluation result, while transmitting the client evaluation result to the cloud storage device is carried out after receiving the cloud cryptographic commitment.

Embodiments of the method for the client device may further comprise:
  reproducing the cloud cryptographic commitment by using the cloud evaluation result, and
  producing, if the reproduced cloud cryptographic commitment fails to match the received cloud cryptographic commitment, a warning message.

That is, the client device may not only check the cloud evaluation itself, but also the cloud evaluation commitment. A warning message is produced, and may be sent to the user and/or another entity, when cloud cryptographic commitment is found not to match with the cloud evaluation result.

In a further embodiment, a cryptographic commitment is produced by using a hash function, preferably a cryptographic hash function, which may be known per se.

To enhance the data security, the data stored in the cloud storage device may be encrypted. In some embodiments, therefore, the data stored in the cloud storage device are encrypted data, at least one decryption key is stored in a key storage device separate from the cloud storage device, and a key identification is associated with the at least one decryption key, the method further comprising:
  receiving a key identification for the requested data,
  retrieving, by using the key identification, a decryption key from the key storage device, and
  decrypting the received data.

By storing at least one decryption key in a key storage device separate from the cloud storage device, it is avoided that a compromised cloud storage device can decrypt the data. The client device may receive the key identification from the user. The cloud storage device may also store the key identification.

It is noted that the client device may be a user device, such as a smartphone, smartwatch, smartglasses, tablet device or (laptop or desktop) computer which is trusted by the user. However, in some embodiments the client device may be a device separate from the user device, such as a separate computer, server, or dedicated device. The client device may in some embodiment be constituted by a central server of a hospital or company, for example. In yet other embodiments, the client device may be a device embodied in hardware and/or software on a user device, such as a hardware module in a computer or smartphone of a user, or a software module in a computer or smartphone of a user.

The present invention also provides a method for a cloud storage device to provide data to a client device, the method comprising:
  receiving a user request specifying requested data,
  producing a cloud evaluation result by evaluating the access policy associated with the requested data,
  transmitting the cloud evaluation result to the client device,
  receiving a client evaluation result from the client device,
  comparing the client evaluation result and the cloud evaluation result, and
  producing, if the client evaluation result fails to match the cloud evaluation result, a warning message.

The method for the cloud storage device also involves comparing evaluation results. Thus, the cloud storage device may determine that the client device is not compromised.

In an embodiment, the method further comprises receiving a client cryptographic commitment, wherein the client cryptographic commitment is a cryptographic commitment on a client evaluation result produced by the client device by evaluating an access policy associated with the requested data. Receiving the client cryptographic commitment allows the cloud storage device to check, if desired, the client evaluation result.

The present invention further provides a method for a client device to test a cloud storage device using an access policy, the method comprising:
  providing a client evaluation result which fails to comply with an access policy associated with the requested data, producing a client cryptographic commitment on the client evaluation result, transmitting a user request and the client cryptographic commitment to the cloud storage device, receiving a cloud evaluation result from the cloud storage device, the cloud evaluation result being produced by the cloud storage device by evaluating the access policy associated with the requested data, comparing the client evaluation result and the cloud evaluation result, and producing, if the client evaluation result fails to match the cloud evaluation result, a warning message.

By intentionally providing a client evaluation result which is known to fail to comply with the access policy, it can be checked whether a warning message is actually produced. In alternative embodiments, a client evaluation result may be used which is known to comply with the access policy, in which case a warning message should not be produced. It is noted that embodiments can be envisaged in which the client device, cloud storage device and/or key storage device always produces a message in response to the comparing of evaluation results, which message may be positive (the evaluation results match) or negative (the evaluation results do not match).

The present invention yet further provides a software program product comprising instructions allowing a processor to carry out one or more of the methods described above.

The software program product may be stored on a tangible carrier, such as a DVD or a USB stick. Alternatively, the software program product may be stored on a server from which it may be downloaded using the Internet. The software program product contains software instructions which can be carried out by the processor of a device, such as a server, a user device (for example a smartphone), and/or a monitoring device.

The present invention still further provides a client device configured for utilizing the client device method described above, as well as a cloud storage device configured for utilizing the cloud storage method described above.

More in particular, the present provides a client device configured to request data from a cloud storage device, the client device comprising:

a first receiving unit configured to receive a user request specifying requested data, an evaluation unit configured to produce a client evaluation result by evaluating an access policy associated with the requested data, a transmission unit configured to transmit the user request to the cloud storage device, a second receiving unit configured to receive a cloud evaluation result from the cloud storage device, the cloud evaluation result being produced by the cloud storage device by evaluating the access policy associated with the requested data, a comparison unit configured to compare the client evaluation result and the cloud evaluation result, and a warning unit configured to produce, if the client evaluation result fails to match the cloud evaluation result, a warning message.

The client device may further comprise a commitment unit configured to produce a client cryptographic commitment on the client evaluation result, while the transmission unit is configured to also transmit the client cryptographic commitment to the cloud storage device.

The present invention further provides a cloud storage device configured to receive a client cryptographic commitment and a user request specifying requested data, wherein the client cryptographic commitment is a cryptographic commitment on a client evaluation result produced by the client device by evaluating an access policy associated with the requested data, the cloud storage device comprising:

an evaluation unit configured to produce a cloud evaluation result by evaluating the access policy associated with the requested data, a transmission unit configured to transmit the cloud evaluation result to the client device, a receiving unit configured to receive a client evaluation result from the client device, a comparison unit configured to compare the client evaluation result and the cloud evaluation result, and a warning unit configured to produce, if the client evaluation result fails to match the cloud evaluation result, a warning message.

The present invention additionally provides a data storage system, comprising at least one client device and at least one cloud storage device as described above. The data storage system may additionally comprise at least key storage device.

BRIEF DESCRIPTION OF THE DRAWINGS

The present invention will further be explained with reference to exemplary embodiments illustrated in the drawings, in which.

DETAILED DESCRIPTION OF EMBODIMENTS

The invention allows to check the enforcement of data access policies when a data access request is processed. Checking can be achieved by evaluating an access policy both in a client device and in a cloud storage device, and in some embodiments also in a key storage device, and comparing the resulting evaluation results of the devices. According to the invention, therefore, an access policy is checked by multiple devices. In some embodiments, a device may initially send a commitment to another device, before revealing its evaluation result. In such and other embodiments, a device may only reveal its evaluation result after receiving the evaluation result of another device, or at least the commitment on the evaluation result of the other device.

The invention will now be explained with reference to exemplary embodiments which are not intended to limit the invention.

Figure 1:
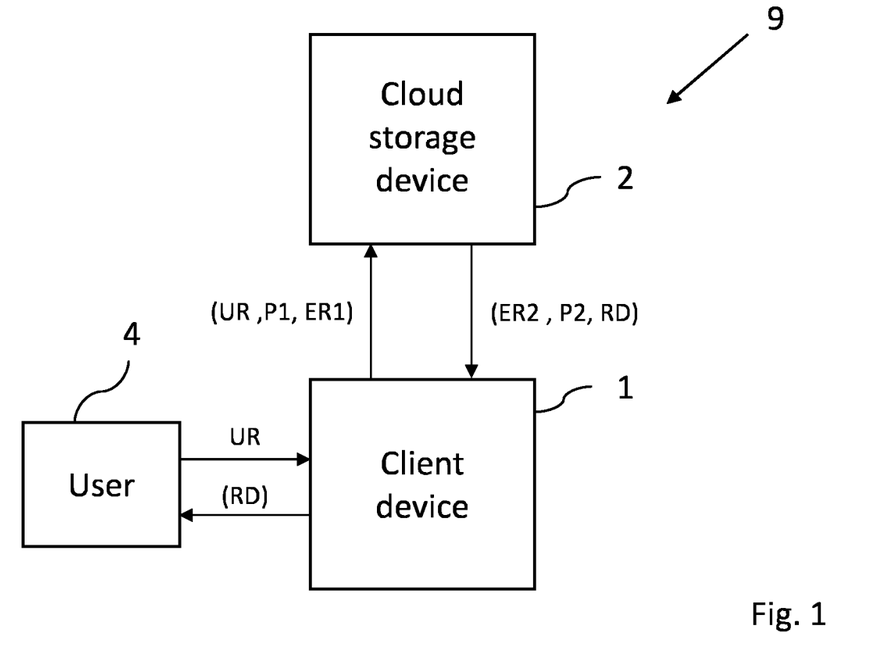
FIG. 1 schematically shows a first embodiment of a cloud storage system in accordance with the present invention.

The embodiment of a data storage system schematically illustrated in FIG. 1 comprises a client device 1, a cloud storage device 2 and a user 4. The client device 1 can be a (desktop or laptop) computer, a tablet device, a smartphone, a hardware module in any of these devices mentioned, and/or a software module in any of these devices. The user 3 can be a person or another computer, tablet device or smartphone. The user may or may not be the owner of the stored data. The cloud storage device 2 may include a single server but will typically include a plurality of interconnected servers, each server having data storage capacity.

For the sake of simplicity, only a single client device 1, a single cloud storage device 2 and a single user 4 are shown in FIG. 1. It will be understood that multiple users, multiple cloud storage devices and/or multiple client devices may be utilized in a data storage system without departing from the present invention.

As illustrated in FIG. 1, the user 4 may transmit a user request UR to the client device 1. The user request can specify requested data, that is, data requested by the user 1. The client device 1 evaluates the access policy of the requested data. To this end, the access policies of various sets of data and/or of various users may be stored in the client device 1. In some embodiments, the access policies may be stored in a separate policies storage device (not shown in FIG. 1), separate from the client device 1.

The result of the access policy evaluation by the client device is the (first) evaluation result ER1, which the client device 1 may send to the cloud storage device 2. As later will be explained in more detail, the client device 1 may only send its evaluation results if one or more conditions have been fulfilled. In some embodiments, the client device may initially send its commitment P1 on its evaluation result to the cloud storage device 2, before or instead of sending its evaluation result ER1.

In response to receiving the user request UR, which specifies the requested data (RD), the cloud storage device can also evaluate the access policy of the requested data. That is, the cloud storage device 2 may also store the access policies of various sets of data and/or of various users, or may retrieve these access policies from a separate policies storage device. The result of the access policy evaluation by the cloud storage device is the (second) evaluation result ER2, which the cloud storage device 2 may send to the client device 1. As later will be explained in more detail, the cloud storage device 2 may only send its evaluation results if one or more conditions have been fulfilled. In some embodiments, the cloud storage device may initially send its commitment P2 on its evaluation result to the client device 1, before or instead of sending its evaluation result ER2.

Under certain conditions, the cloud storage device 2 will transmit the requested data RD to the client device 1, which may then forward the requested data to the user 4. These conditions, which will later be explained in more detail, may include one or more of:
  the evaluation results ER1 and ER2 both being positive;
  the commitments on the evaluation results both matching the respective evaluation results; and
  the data being available.
The requested data may be stored in plaintext, but typically the data stored in the cloud storage device will be encrypted. Decryption keys are, in the embodiment of FIG. 2, stored in a separate key storage device 3. When the client device 1 passes on a user request UR to the cloud storage device 2, it can also pass on the user request UR to the key storage device 3. Either the user request itself contains a reference to a key identification (KI), or the client device 1 derives a key identification from the user request and transmits the key identification KI to the key storage device 3, with or without the user request UR.

Figure 2:
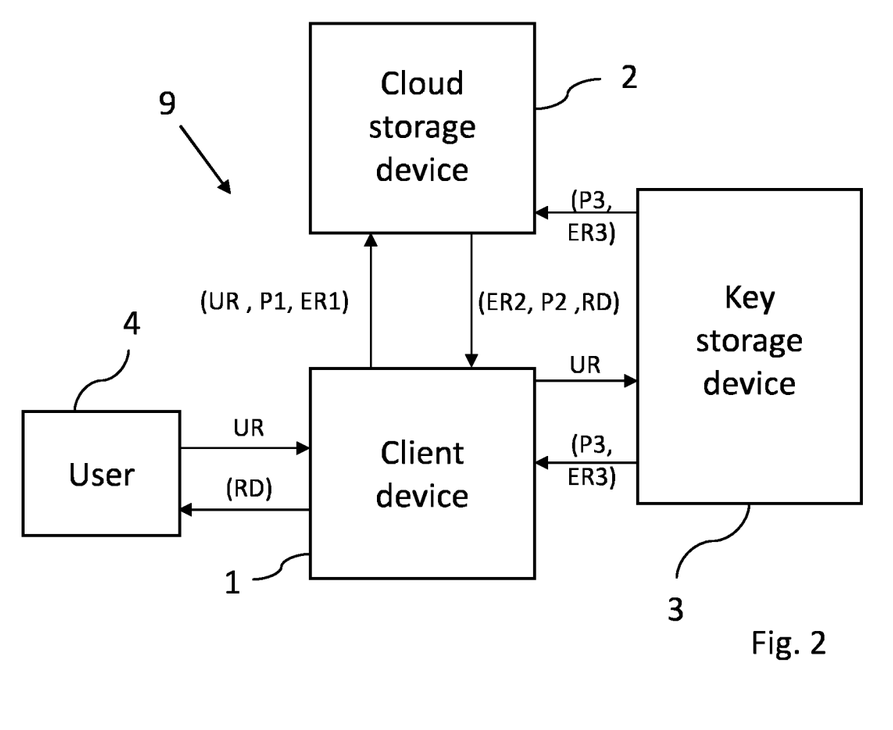
FIG. 2 schematically shows a second embodiment of a cloud storage system in accordance with the present invention.

In accordance with the invention, the key storage device 3 evaluates the access policy of the requested key. Similar to the (first) evaluation result ER1 of the client device 1 and the (second) evaluation result ER2 of the cloud storage device 2, the key storage device 3 produces a (third) evaluation result ER3. Additionally, the key storage device 3 may produce a (third) commitment P3 on the (third) evaluation result ER3.

Figure 3A:
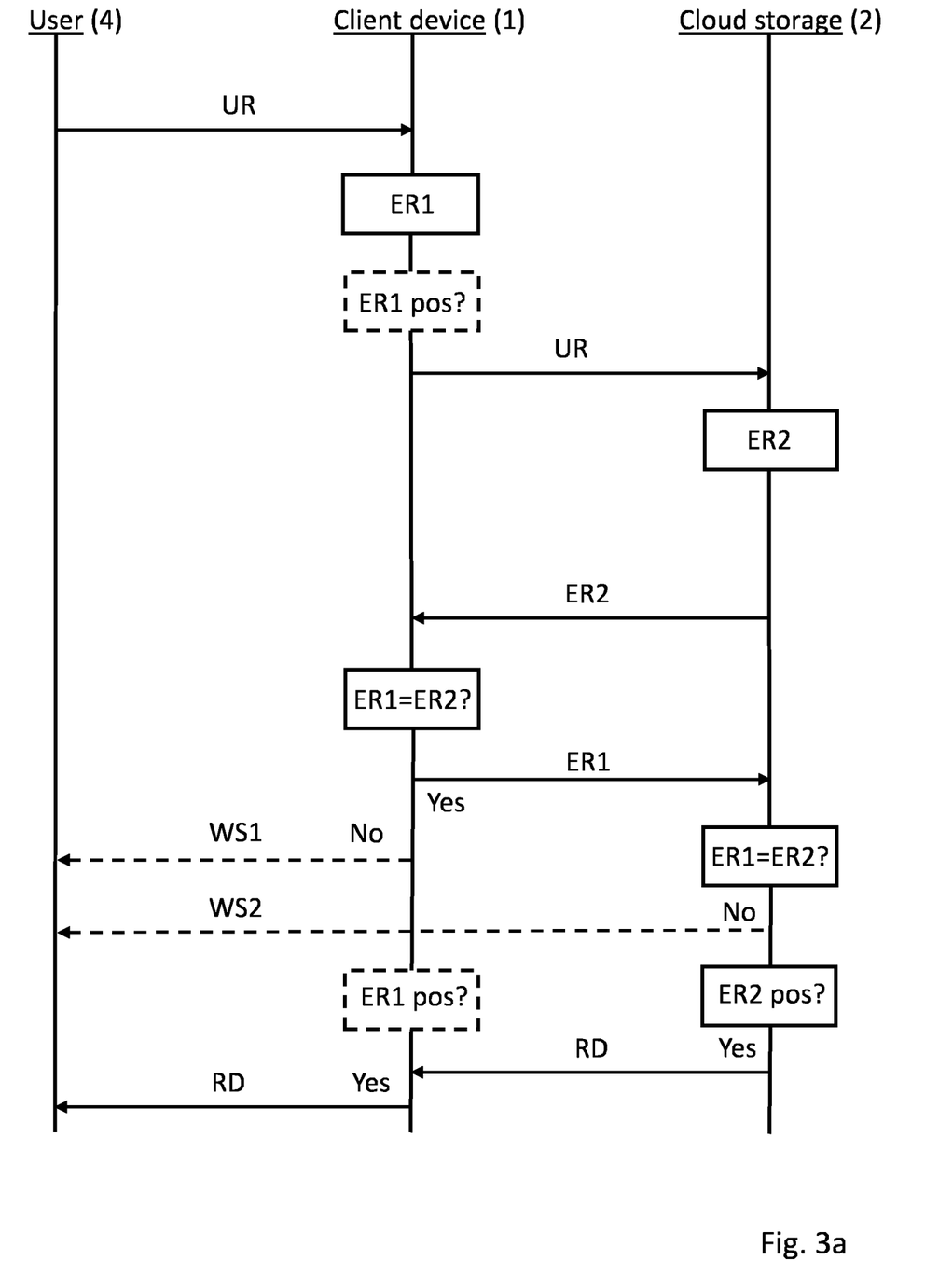
FIG. 3a schematically shows a first embodiment of interaction between a user, a client device and a cloud storage device in accordance with the present invention.

An exemplary interaction between a client device, a user and a cloud storage device is illustrated in FIG. 3a. In the embodiment of FIG. 3a, the interaction is initiated by the user 4 sending a user request UR to the client device 1. As mentioned above, the user request UR specifies the requested data and identifies the requesting user.

After receipt of the user request UR, the client device evaluates the access policy of the requested data and produces its evaluation result ER1. A positive evaluation result indicates that access is granted, while a negative result indicates that access is denied. The evaluation may involve comparing the (identification of the) requesting user with a list of accepted users, which list is associated with the stored data and constitutes, or is part of, an access policy.

In the embodiment of FIG. 3a, the user request UR is forwarded to the cloud storage (device) 2, irrespective of the evaluation result ER1 of the client device. This allows the evaluation results of different entities (in this case, the client device and the cloud storage device) to be compared. The cloud storage device also evaluates the user request and produces an evaluation result ER2. In the embodiment of FIG. 3a, this second evaluation result ER2 is sent to the client device, which can then compare the evaluation results: is ER1 equal to ER2?

If the evaluation results fail to match, the client device may produce a warning message WM1 and send this message to the user, and/or to another entity, such as a supervising entity. If the evaluation results do match, the client device can send its evaluation result ER1 to the cloud storage device, which can then compare the evaluation results. If the cloud storage device determines that the evaluation results fail to match, it can send a warning message WM2 to the user and/or to another entity, as mentioned above. If the cloud storage device determines that the evaluation results ER1 and ER2 correspond, then it may additionally determine whether its evaluation result is positive, that is, whether the evaluation of the access policy yields that the requested data may be accessed. It is noted that the test for a positive evaluation result may be carried out earlier, for example as soon as the (second) evaluation result ER2 is known.

If both tests carried out by the cloud storage device produce a positive result, then the cloud storage device can transmit the requested data RD to the client device, which may in turn transmit the requested data RD to the user. It is noted that the client device may, in some embodiments, only send the requested data to the user if its (first) evaluation result is positive, indicating that the access policy allows the requested data to be accessed. The client device may carry out the test for a positive (first) evaluation result ER1 at various points in the interaction, for example immediately after determining the (first) evaluation result, or immediately before forwarding the requested data RD to the user, as schematically illustrated in FIG. 3a.

The effect of the interaction according to the above embodiment is that both the client device and the cloud storage device may independently check the access policy of the requested data, and the devices may each check whether the evaluation result of the other device matches their own evaluation result. This allows the detection of fraud, in case one of the devices is compromised, or at least when one of the devices does not trust the other device.

For example, in the embodiment of FIG. 3a, the client device only transmits its (first) evaluation result ER1 after receiving the (second) evaluation result ER2 from the cloud storage device. As a result, the cloud storage device cannot simply mimic the evaluation result of the client device but must itself evaluate the access policy of the requested data. By sending its evaluation result and having it checked by the client device, the cloud storage device shows that it is in possession of the access policy. Similarly, the client device shows the cloud evaluation device that it is (also) in possession of the access policy.

In the embodiment of FIG. 3a, a compromised client device could mimic the evaluation result ER2 of the cloud storage device, which might not be noticed by the cloud storage device. This can be prevented by using one or more commitments, as will later be explained in more detail with reference to FIGS. 3c and 3d.

Figure 3B:
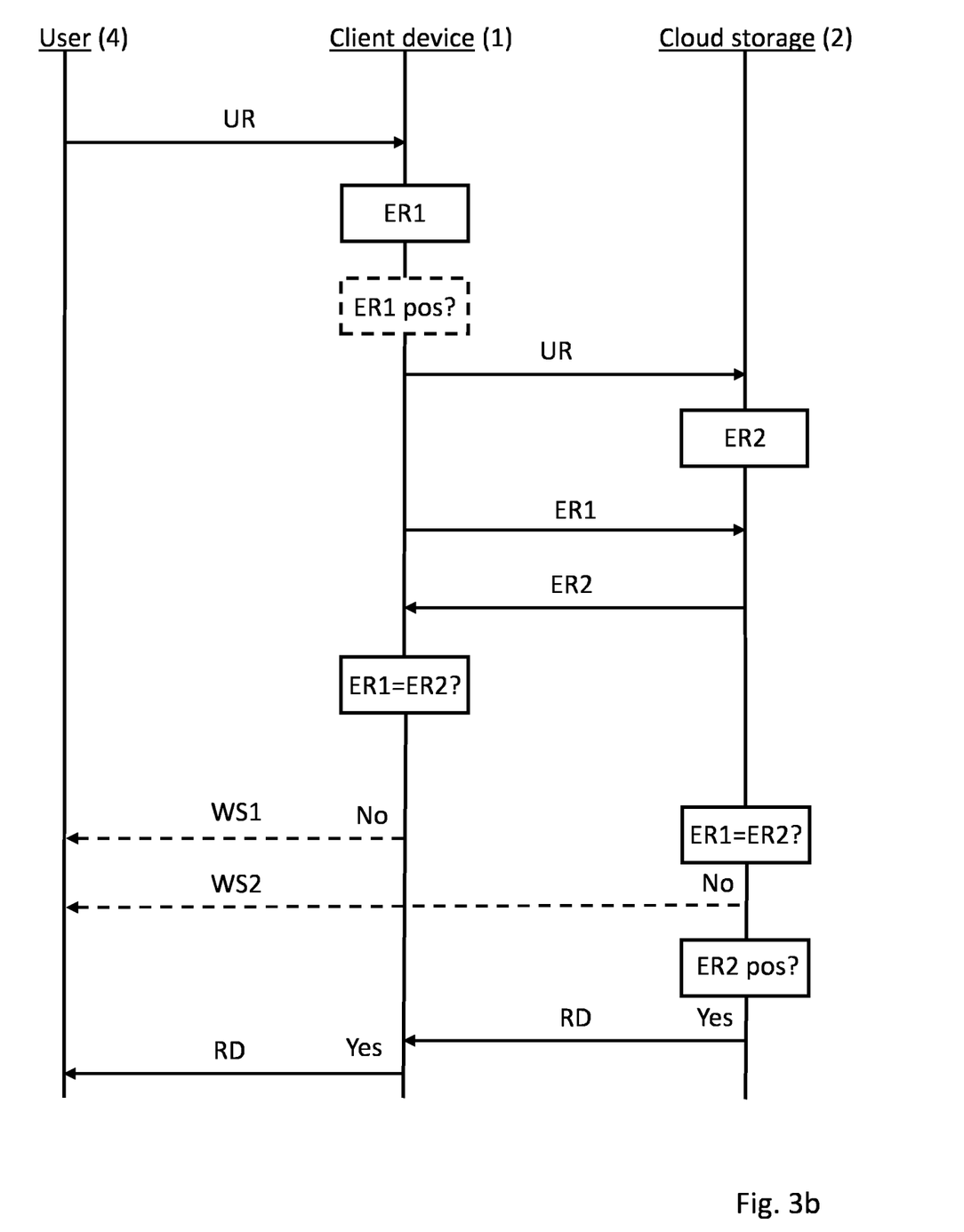
FIG. 3b schematically shows a second embodiment of interaction between a user, a client device and a cloud storage device in accordance with the present invention.

The embodiment of FIG. 3b is identical to the one of FIG. 3a, with the exception of the transmission of the first evaluation result ER1 from the client device to the cloud storage device. IN the embodiment of FIG. 3b, this transmission is carried out before the client device receives the second evaluation result ER2 from the cloud storage device. Although this embodiment is feasible, the embodiment of FIG. 3a provides a higher level of security.

The level of security can be further enhanced by using commitments on one or more evaluation results. As is well known in the field of cryptography, commitments are values which may be derived from another, original value, such as an evaluation result value, by using a hash function or another one-way function. A one-way function does not allow the original value (for example an evaluation result value) to be derived from the outcome (for example a commitment value).

Figure 3C:
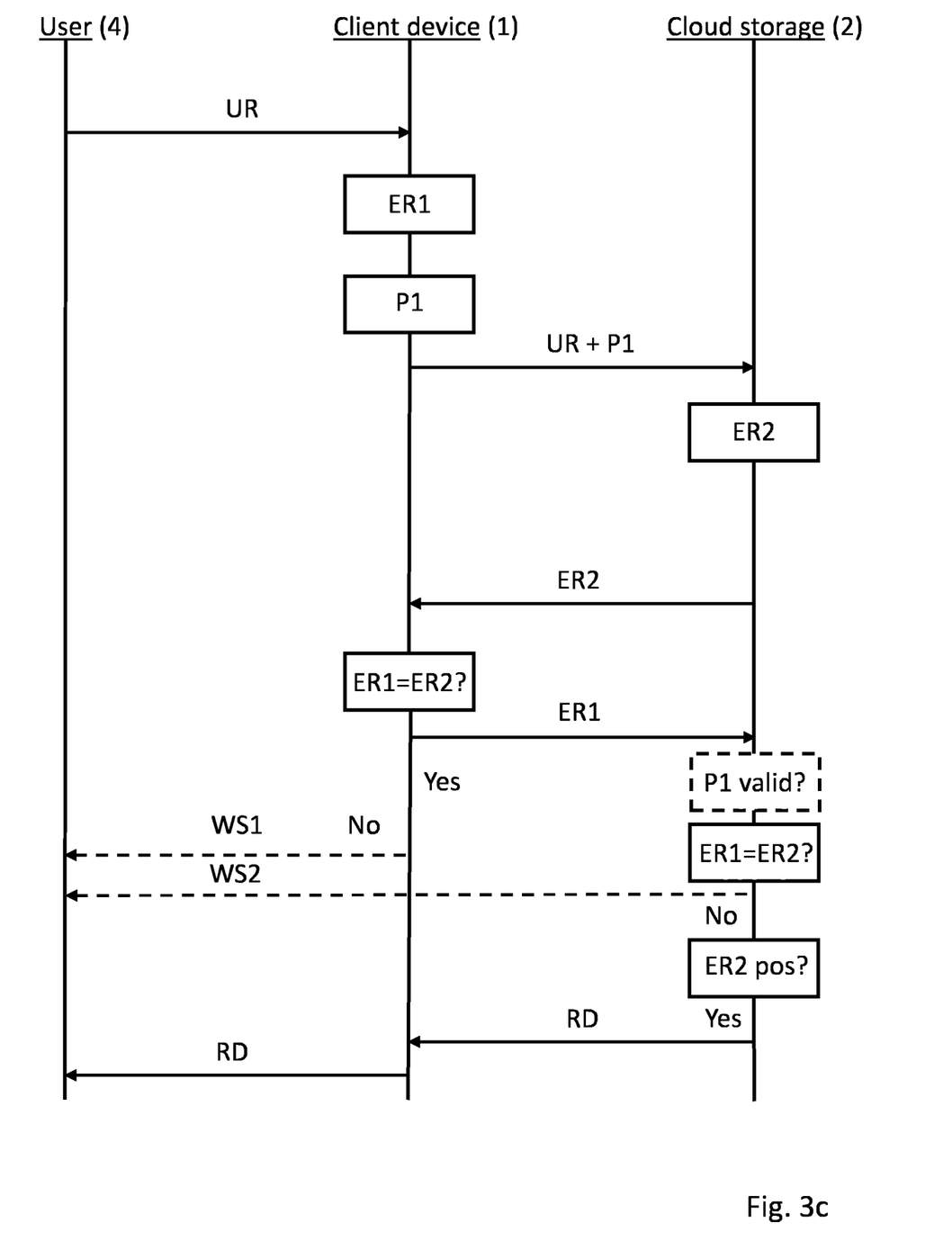
FIG. 3c schematically shows a third embodiment of interaction between a user, a client device and a cloud storage device in accordance with the present invention.

In the embodiment of FIG. 3c, the client device produces a (first) commitment P1 on its (first) evaluation result ER1 and transmits this commitment to the cloud storage device. In the embodiment shown, the commitment P1 is transmitted together with the user request UR, but the commitment and the user request may also be sent separately.

By receiving the commitment P1, the cloud storage device has the possibility to check whether the commitment matches the evaluation result ER1, which it receives later during the interaction. The cloud storage device may or may not check the evaluation result ER1, but the client device knows that the cloud storage device may do so, and that any discrepancy between the evaluation result ER1 and the commitment P1 may be detected. The checking of the validity of the commitment P1 ("P1 valid") is an optional action in the embodiment of FIG. 3c, while in other embodiments this action may be compulsory.

If the commitment P1 is found to be not valid, that is, if the commitment P1 cannot be matched with the corresponding evaluation result ER1, then the cloud storage device may produce a warning message WM2 and send this warning message to the user, for example. The interaction may then be aborted. If the commitment P1 is found to be valid, the interaction typically continues.

In the embodiment of FIG. 3c, only the client device produces a commitment. This embodiment is particularly suitable when the client device does not trust the cloud storage device. In other embodiments, the cloud storage device may produce a commitment on its evaluation result, while the client device produces no commitment. Such embodiments are particularly suitable when the cloud storage device does not trust the client device.

In still other embodiments, both the client device and the cloud storage device produce a commitment. Such embodiments are particularly suitable when the client device and the cloud storage device do not trust each other, or simply to enhance the overall security of the interaction.

Figure 3D:
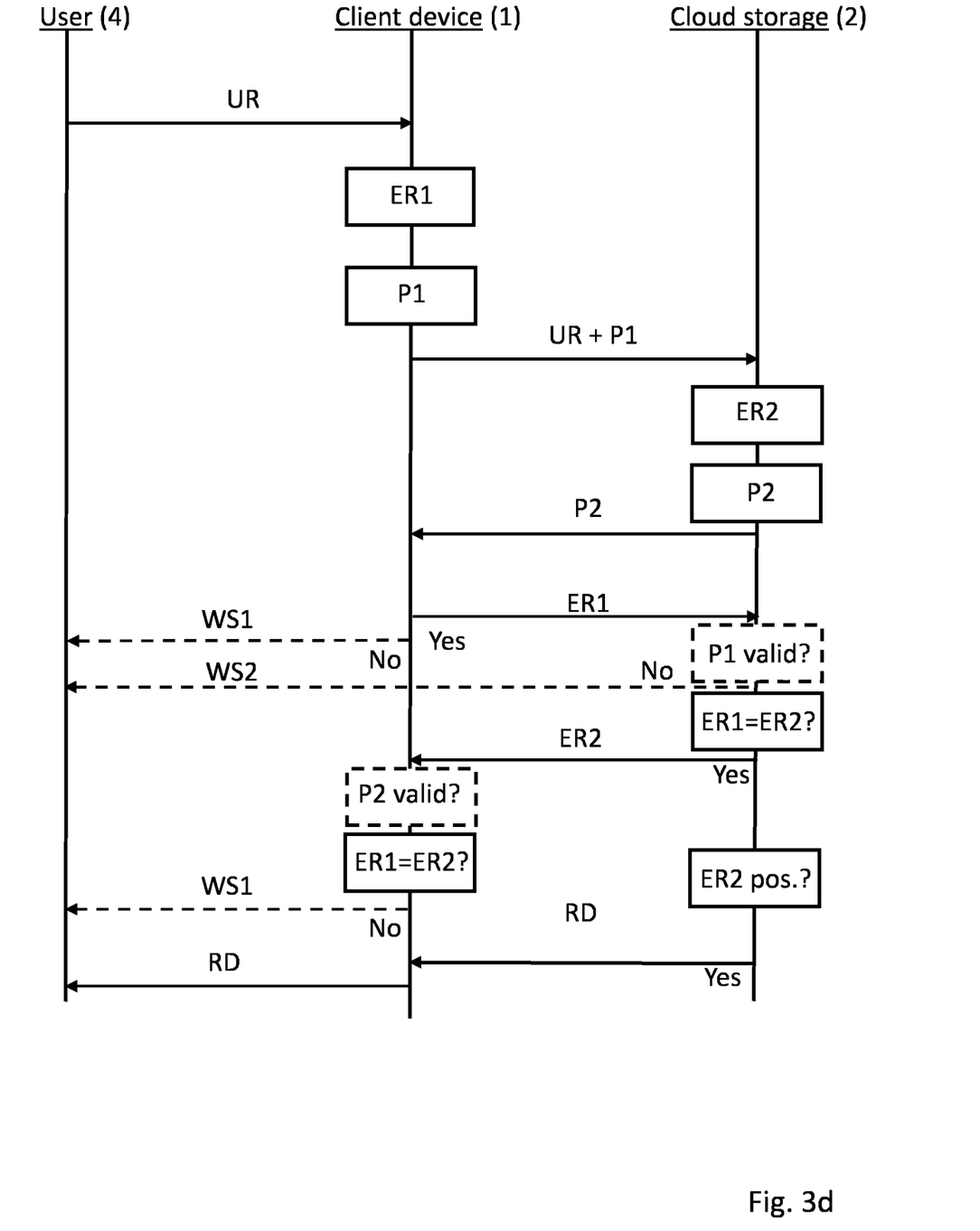
FIG. 3d schematically shows a fourth embodiment of interaction between a user, a client device and a cloud storage device in accordance with the present invention.

An exemplary embodiment in which both the client device and the cloud storage device produce a commitment is schematically illustrated in FIG. 3d. In this embodiment, the client device produces and transmits a (first) commitment P1 on its (first) evaluation result ER1, while the cloud storage device produces and transmits a (second) commitment P2 on its (second) evaluation result ER2. This allows both devices to check the validity of the commitment produced by the other device. In FIG. 3d, the validity check actions ("P1 valid?"; "P2 valid?") are shown as optional actions, but in some embodiments they may be compulsory. If a commitment is found to be invalid, that is, if it fails to match the corresponding evaluation result, a warning message may be issued. Additionally, or alternatively, the interaction may be aborted.

For example, when the client device receives the (second) evaluation result ER2 from the cloud storage device, the client device may check the validity of the (second) commitment P2 which it received earlier, for example by reproducing the commitment using the evaluation result. If the reproduced commitment is not equal to the received commitment P2, the validity check fails and a warning message WM1 may be produced.

As mentioned above, the data stored in the server may be encrypted data. The data may have been encrypted by using a secret key. Alternatively, asymmetric encryption may be used involving a public encryption key and a secret decryption key.

Exemplary embodiments of devices implementing the present invention are schematically illustrated in FIGS. 4a, 4b, 5a and 5b. The embodiments shown include a client device 1, a cloud storage device 2, a key storage device 3, and a user device 4. It is noted that the user device may include a handheld device, such as a smartphone. The client device 1 may include another device, separate from the user device, but may in some embodiments include a hardware or software module located in the user device.

Figure 4A:
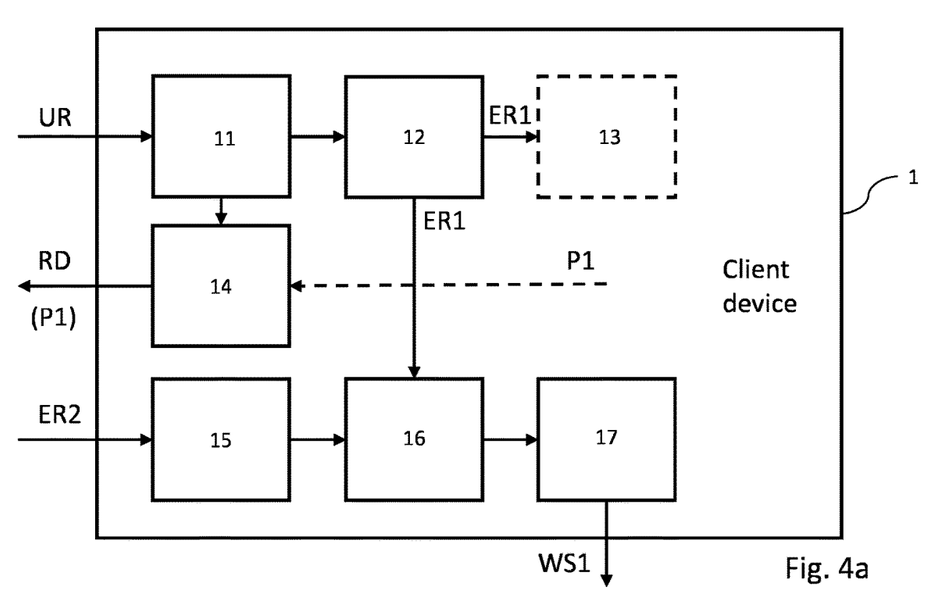
FIGS. 4a and 4b schematically shows devices in accordance with the present invention.
Figure 4B:
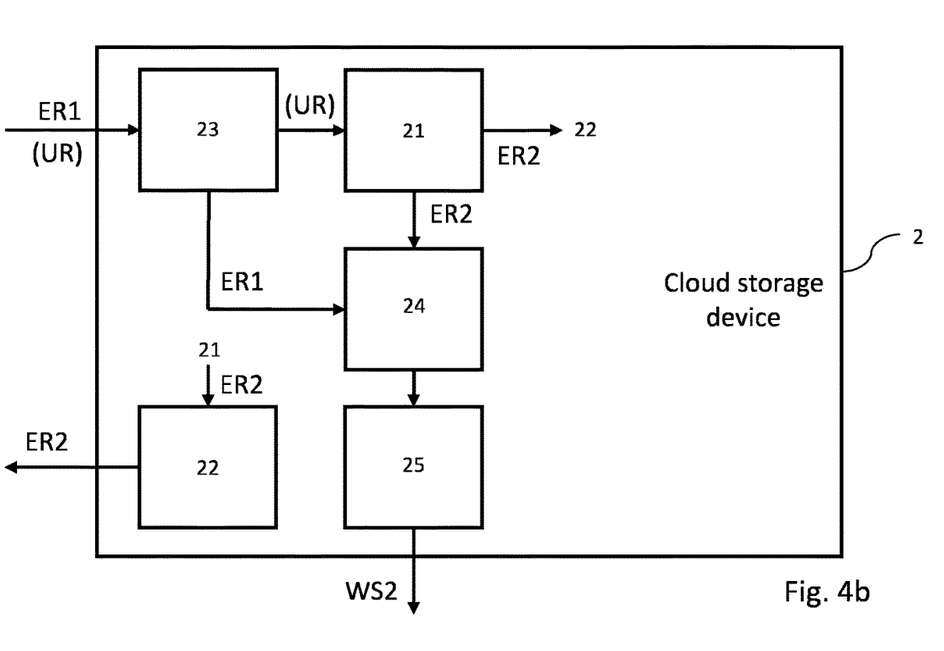

A client device 1 configured to request data from a cloud storage device 2 may comprise:

a first receiving unit 11 configured to receive a user request UR specifying requested data RD, an evaluation unit 12 configured to produce a client evaluation result ER1 by evaluating an access policy associated with the requested data, a transmission unit 14 configured to transmit the user request UR and the client cryptographic commitment P1 to the cloud storage device 2, a second receiving unit 15 configured to receive a cloud evaluation result ER2 from the cloud storage device 2, the cloud evaluation result ER2 being produced by the cloud storage device 2 by evaluating the access policy associated with the requested data, a comparison unit 16 configured to compare the client evaluation result ER1 and the cloud evaluation result ER2, and a warning unit 17 configured to produce, if the client evaluation result ER1 fails to match the cloud evaluation result ER2, a warning message WM1.

A client device 1 may further comprise:

a commitment unit 13 configured to produce a client cryptographic commitment P1 on the client evaluation result ER1.

Figure 5A:
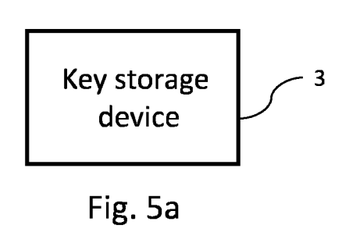
FIGS. 5a and 5b schematically show devices in accordance with the present invention.
Figure 5B:
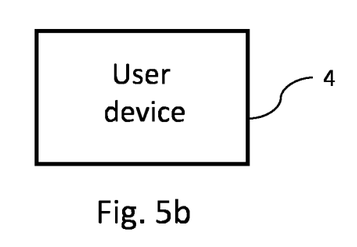

In accordance with the invention, a cloud storage device 2 configured to receive a user request UR specifying requested data may comprise:

an evaluation unit 21 configured to produce a cloud evaluation result ER2 by evaluating the access policy associated with the requested data, a transmission unit 22 configured to transmit the cloud evaluation result ER2 to the client device 1, a receiving unit 23 configured to receive a client evaluation result ER1 from the client device 1, a comparison unit 24 configured to compare the client evaluation result ER1 and the cloud evaluation result ER2, and a warning unit 25 configured to produce, if the client evaluation result ER1 fails to match the cloud evaluation result ER2, a warning message WM2.

In accordance with the invention, a data storage system may comprise at least one client device 1 as mentioned above and at least one cloud storage device 2 as mentioned above.

Figure 6:
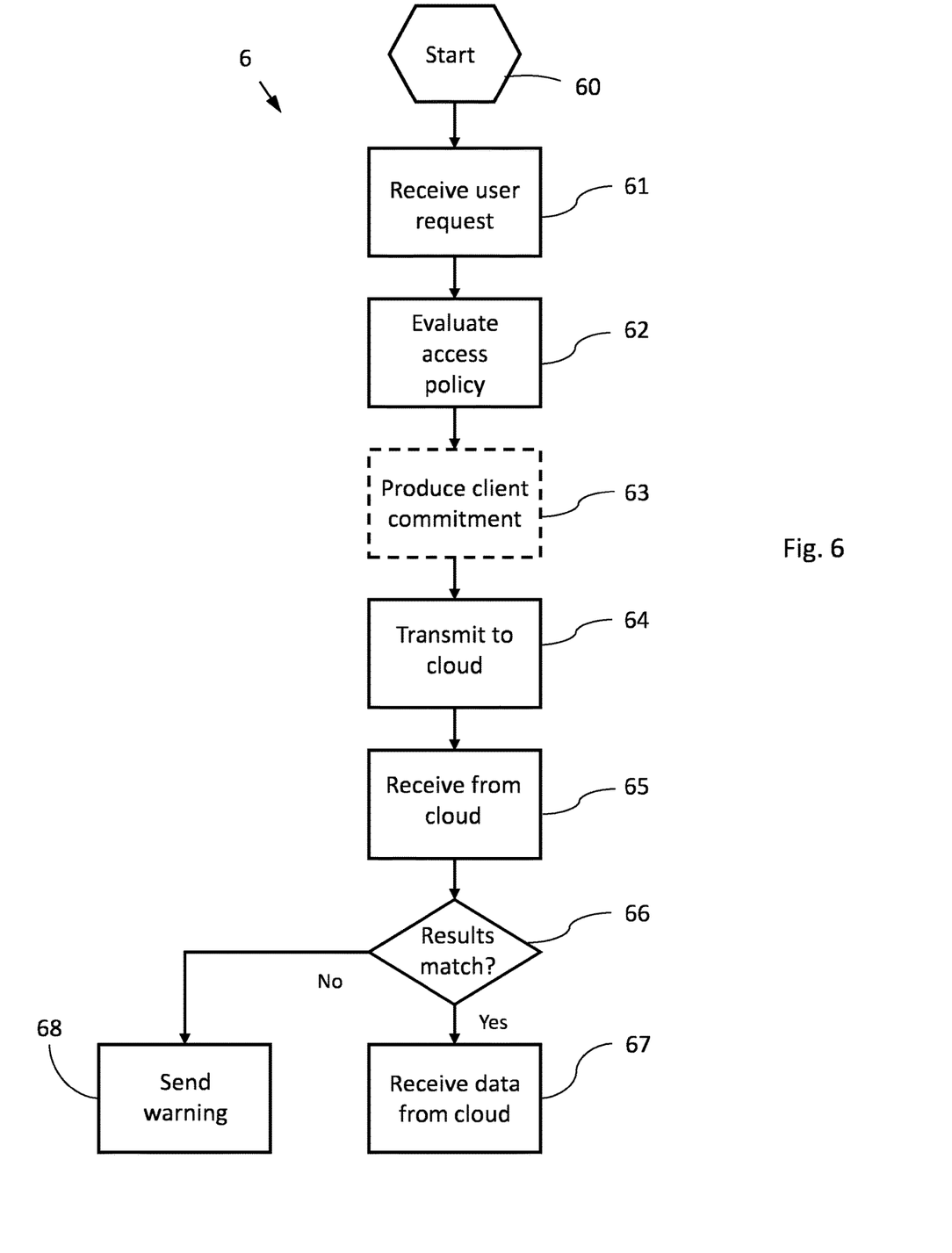
FIG. 6 schematically shows an embodiment of a method for a client device in accordance with the present invention.

An embodiment of the method according to the present invention is schematically illustrated in FIG. 6. The embodiment illustrates a method 6 for a client device 1 to request data from a cloud storage device 2, the method comprising:

receiving a user request UR specifying requested data RD (action 61), producing a client evaluation result ER1 by evaluating an access policy associated with the requested data (action 62), transmitting the user request UR to the cloud storage device 2 (action 64), receiving a cloud evaluation result ER2 from the cloud storage device 2, the cloud evaluation result ER2 being produced by the cloud storage device 2 by evaluating the access policy associated with the requested data (action 65), comparing the client evaluation result ER1 and the cloud evaluation result ER2 (action 66), and producing, if the client evaluation result ER1 fails to match the cloud evaluation result ER2, a warning message WM (action 68).

It can be seen that producing a client commitment (action 63) is optional. A cryptographic commitment (P1; P2) may be produced by using a cryptographic hash function.

Figure 7:
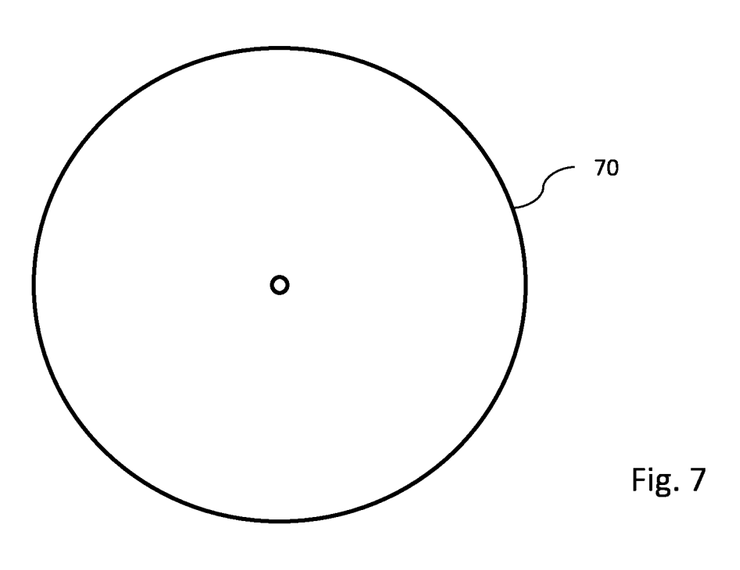
FIG. 7 schematically shows a software program product including instructions allowing a processor to carry out at least one method according to the present invention.

An exemplary embodiment of a software program product is illustrated in FIG. 7. The software program product 70 may include a tangible carrier, such as a DVD, which stores instructions which allow a processor to carry out the method or methods according to the invention. Additionally, or alternatively, a software program product may be stored on a remote server and be downloaded to a user device, a client device, a cloud storage device and/or a key storage device, for example by using the Internet.

It will be understood that the description of the invention given above is not intended to limit the invention in any way. Singular nouns and the articles "a" and "an" are of course not meant to exclude the possibility of plurals. Devices mentioned in this document, such as smartphones, may be replaced with their successors, even if these successors are not yet known at the time of writing. As is well established in the law of patents, the abstract should never be used to limit the scope of the claims, and neither should reference numbers in the claims.

It will further be understood by those skilled in the art that the present invention is not limited to the embodiments mentioned above and that many additions and modifications are possible without departing from the scope of the invention as defined in the appending claims.

The invention claimed is:

1. A method for a client device to request data from a cloud storage device, the method comprising:
    receiving, at the client device, a user request (UR) specifying requested data (RID),
    producing, at the client device, a client evaluation result (ER1) by evaluating an access policy associated with the requested data,
    transmitting, by the client device, the user request (UR) to the cloud storage device,
    receiving, at the client device, a cloud evaluation result (ER2) from the cloud storage device, the cloud evaluation result (ER2) being produced by the cloud storage device by evaluating the access policy associated with the requested data,
    comparing, at the client device, the client evaluation result (ER1) and the cloud evaluation result (ER2), and
    producing, if the client evaluation result (ER1) fails to match the cloud evaluation result (ER2), a warning message (WM).

2. The method according to claim 1, further comprising:
    producing a client cryptographic commitment (PI) on the client evaluation result (ER1), and transmitting the client cryptographic commitment (PI) to the cloud storage device.

3. The method according to claim 2, further comprising transmitting the client cryptographic commitment (PI) to the cloud storage device together with the user request (UR).

4. The method according to claim 1, further comprising:
    transmitting the client evaluation result (ER1) to the cloud storage device, only if the client evaluation result (ER1) matches the cloud evaluation result (ER2) and if the evaluation result (ER1) is positive.

5. The method according to claim 4, wherein the access policy is stored in both the client device (k) and the cloud storage device.

6. The method according claim 5, wherein data stored in the cloud storage device are encrypted data, wherein at least one decryption key (DK) is stored in a key storage device separate from the cloud storage device, and wherein a key identification (KID) is associated with the at least one decryption key, the method further comprising:
    receiving a key identification (KID) for the requested data (RD),
    retrieving, by using the key identification (KID), a decryption key (DK) from the key storage device, and
    decrypting the received data.

7. The method according to claim 4, wherein receiving the cloud evaluation result (ER2) from the cloud storage device is preceded by:
    receiving a cloud cryptographic commitment (P2) on the cloud evaluation result (ER2), and
    transmitting the client evaluation result (ER1) to the cloud storage device, which method may further comprise:

reproducing the cloud cryptographic commitment (P2) by using the cloud evaluation result (ER2), and producing, if the reproduced cloud cryptographic commitment fails to match the received cloud cryptographic commitment, a warning message (WM).

8. A method for a cloud storage device to provide data to a client device, the method comprising:

receiving, at the cloud storage device, a user request (UR) specifying requested data, producing, at the cloud storage device, a cloud evaluation result (ER2) by evaluating the access policy associated with the requested data, transmitting, by the cloud storage device, the cloud evaluation result (ER2) to the client device, receiving, at the cloud storage device, a client evaluation result (ER1) from the client device, comparing, at the cloud storage device, the client evaluation result (ER1) and the cloud evaluation result (ER2), and producing, if the client evaluation result (ER1) fails to match the cloud evaluation result (ER2), a warning message (WM).

9. The method according to claim 8, further comprising:

transmitting, if the client evaluation result (ER1) matches the cloud evaluation result (ER2) and if the evaluation result (ER2) is positive, the requested data (RD) to the client device.

10. The method according to claim 8, wherein transmitting the cloud evaluation result (ER2) to the client device is preceded by:

producing a cloud cryptographic commitment (P2) on the cloud evaluation result (ER2), transmitting the cloud cryptographic commitment (P2) to the client device, and receiving a client evaluation result (ER1) from the client device.

11. The method according to claim 8, the method further comprising:

receiving a client cryptographic commitment (PI), wherein the client cryptographic commitment (PI) is a cryptographic commitment on a client evaluation result (ER1) produced by the client device by evaluating an access policy associated with the requested data.

12. A method for a key storage device to provide a decryption key (DK) to a client device, the method comprising:

receiving a client cryptographic commitment (PI) and a user request (UR) specifying requested data, wherein the client cryptographic commitment (PI) is a cryptographic commitment on a client evaluation result (ER1) produced by the client device by evaluating an access policy associated with a requested decryption key, producing a key evaluation result (ER3) by evaluating the access policy associated with the requested decryption key (DK), transmitting the key evaluation result (ER3) to the client device, receiving a client evaluation result (ER1) from the client device, comparing the client evaluation result (ER1) and the key evaluation result (ER3), and producing, if the client evaluation result (ER1) fails to match the key evaluation result (ER3), a warning message (WM).

13. A method for a client device to test a cloud storage device using an access policy, the method comprising:

producing a client evaluation result (ER1) which fails to comply with an access policy associated with the requested data, producing a client cryptographic commitment (PI) on the client evaluation result (ER1), transmitting a user request (UR) and the client cryptographic commitment (PI) to the cloud storage device, receiving a cloud evaluation result (ER2) from the cloud storage device, the cloud evaluation result (ER2) being produced by the cloud storage device (3) by evaluating the access policy associated with the requested data, comparing the client evaluation result (ER1) and the cloud evaluation result (ER2), and producing, if the client evaluation result (ER1) fails to match the cloud evaluation result (ER2), a warning message (WM).

14. A software program product comprising instructions allowing a processor to carry out a method for a client device to request data from a cloud storage device, the method comprising:

receiving, at the client device, a user request (UR) specifying requested data (RD), producing, at the client device, a client evaluation result (ER1) by evaluating an access policy associated with the requested data, transmitting, by the client device, the user request (UR) to the cloud storage device, receiving, at the client device, a cloud evaluation result (ER2) from the cloud storage device, the cloud evaluation result (ER2) being produced by the cloud storage device by evaluating the access policy associated with the requested data, comparing, at the client device, the client evaluation result (ER1) and the cloud evaluation result (ER2), and producing, if the client evaluation result (ER1) fails to match the cloud evaluation result (ER2), a warning message (WM).

15. A client device configured to request data from a cloud storage device, the client device comprising:

a first receiving unit configured to receive a user request (UR) specifying requested data (RD), an evaluation unit configured to produce a client evaluation result (ER1) by evaluating an access policy associated with the requested data, a transmission unit configured to transmit the user request (UR) and the client cryptographic commitment (PI) to the cloud storage device, a second receiving unit configured to receive a cloud evaluation result (ER2) from the cloud storage device, the cloud evaluation result (ER2) being produced by the cloud storage device by evaluating the access policy associated with the requested data, a comparison unit configured to compare the client evaluation result (ER1) and the cloud evaluation result (ER2), and a warning unit configured to produce, if the client evaluation result (ER1) fails to match the cloud evaluation result (ER2), a warning message (WM).

16. The client device according to claim 15, further comprising:

a commitment unit configured to produce a client cryptographic commitment (PI) on the client evaluation result (ER1).

17. A cloud storage device configured to receive a user request (UR) specifying requested data, the cloud storage device comprising:

an evaluation unit configured to produce a cloud evaluation result (ER2) by evaluating the access policy associated with the requested data,
a transmission unit configured to transmit the cloud evaluation result (ER2) to the client device,
a receiving unit configured to receive a client evaluation result (ER1) from the client device,
a comparison unit configured to compare the client evaluation result (ER1) and the cloud evaluation result (ER2), and
a warning unit configured to produce, if the client evaluation result (ER1) fails to match the cloud evaluation result (ER2), a warning message (WM).

* * * * *